(12) United States Patent
Amaranthus et al.

(10) Patent No.: US 7,000,348 B2
(45) Date of Patent: Feb. 21, 2006

(54) METHOD AND COMPOSITION FOR TREE ROOT COLONIZATION

(75) Inventors: Michael P. Amaranthus, Grants Pass, OR (US); Muraleedharan G. Nair, Okemos, MI (US); Taylor C. Reid, Lansing, MI (US)

(73) Assignee: Vamtech, LLC, Pittsburgh, PA (US)

( * ) Notice: Subject to any disclaimer, the term of this patent is extended or adjusted under 35 U.S.C. 154(b) by 0 days.

(21) Appl. No.: 10/751,874

(22) Filed: Jan. 6, 2004

(65) Prior Publication Data

US 2004/0200139 A1    Oct. 14, 2004

Related U.S. Application Data

(60) Provisional application No. 60/438,485, filed on Jan. 7, 2003.

(51) Int. Cl.
*A01G 1/04* (2006.01)
*A01H 1/00* (2006.01)
*C12N 1/14* (2006.01)

(52) U.S. Cl. .................... 47/58.1 R; 504/117
(58) Field of Classification Search ............ 47/58.1 R, 47/58.1 SC, 58.1 FV; 504/117
See application file for complete search history.

(56) References Cited

U.S. PATENT DOCUMENTS

| | | | |
|---|---|---|---|
| 4,550,527 A * | 11/1985 | Hall et al. ............... | 47/58.1 R |
| 5,002,603 A | 3/1991 | Safir et al. | |
| 5,085,682 A | 2/1992 | Safir et al. | |
| 5,125,955 A | 6/1992 | Safir et al. | |
| 5,178,642 A * | 1/1993 | Janerette .................. | 47/58.1 R |
| 5,691,275 A | 11/1997 | Nair et al. | |

FOREIGN PATENT DOCUMENTS

WO    WO 92/11752    *    7/1992

OTHER PUBLICATIONS

Amaranthus, M. P., et al., Can. J. For. Res. 17:944-950 (1987).
Amaranthus, M. P., et al., Can. J. For. Res. 19:550-556 (1989).
Amanarthns, M.P., et al., Plant and Soil 159:133-140 (1994).
Amaranthus, M.P., et al., PNW-RP 494 p. 12 (1996).
Amaranthus, M. P., et al, Longleaf Alliance Report No 5 Alexandria, Louisiana Oct. 16-18 77-82 (2001).
Becard, G., et al., New Phytol 112:77-83 (1989).
Bonfante-Fasolo, P., The role of the cell wall as a signal in mycorrihizal associatios, p. 219-235 (1988).
Castellano, M.A., Outplanting performance of mycorrhizal inoculated seedlings, pp. 223-301. (1996).
Elias, K.S., et al., Appl. Environ. Microbial 53:1928-1933 (1987).
Finlay, R.D., et al., New Phytol 110:59-66 (1988).
Gianinazzi-Pearson, V., et al., Symbiosis 7:243-255 (1989).
Lamb, R.J., et al., Aust For. 35:1-7 (1971).
Lamb, R.J., et al., Soil Biol. Biochem. 6:167-171 (1974).
Mexal, J.G., et al., Can. J. of Botany 51:1579-1588 (1973).
Momoh, Z.O., et al., Ann. Appl. Biol. 82:221-226 (1976).
Nair, M.G., et al., Applied and Environmental Microbiology 57:434-439 (1991).

(Continued)

Primary Examiner—Jeffrey L. Gellner
(74) Attorney, Agent, or Firm—Ian C. McLeod

(57) ABSTRACT

A method and compositions for increasing ectomycorrhizal colonization of the roots of trees using an alkali metal formononetinate, formononetin or mixtures thereof is described. The method enhances the growth of healthy and impaired trees.

11 Claims, 5 Drawing Sheets

OTHER PUBLICATIONS

Parke, J. L., et al., New Phytol. 95:83-95 (1983).
Perry, D.A., et al., Can. J. For. Res. 929-940 (1987).
Peterson, T.D., et al., Down to Earth 41:21-25 (1985).
Preest, D.S., New Zealand J. of For. Sci. 73:329-332 (1977).
Reid, C.P.P., IUFRO Symposium Procedings 392-408 (1979).
Skinner, M.F., et al., Soil Biol. Biochem. 6:57-61 (1974a).
Skinner, M.F., et al., Soil Biol. Biochem. 6:53-56 (1974b).
Theodorou, C., et al., Aust. For. 34:183-191 (1970).
Theodorou, C., Aust. For. 35:17-22 (1971).
Theodorou, C., Soil Biol. Biochem 10:33-37 (1978).
Graham, J.H., Mycologia 74:831-835 (1982).

* cited by examiner

Formononetin

Potassium Formononetinate

METHOD AND COMPOSITION FOR TREE ROOT COLONIZATION

CROSS-REFERENCE TO RELATED APPLICATIONS

This application claims priority to Provisional Patent Application Ser. No. 60/438,485, filed Jan. 7, 2003.

STATEMENT REGARDING FEDERALLY SPONSORED RESEARCH OR DEVELOPMENT

None

BACKGROUND OF THE INVENTION (1) Field of the Invention

The present invention relates to a method and compositions for increasing ectomycorrhizal colonization of the roots of trees, such as conifers and other cultivated trees. In particular, the present invention relates to the use of formononetin, an alkali metal formononetinate or mixtures thereof to increase the colonization.

(2) Description of the Related Art

Throughout the western United States, Ponderosa pine and Douglas-fir trees are planted extensively on a variety of sites in urban, suburban, and forestry environments. Disturbed, compacted soils and hot, dry sites are commonly encountered. First-year mortality of planted trees can be high under such harsh conditions (Amaranthus and Malajczuk 2001; Amaranthus and Perry 1987; Preest 1977; Peterson and Newton 1985; Steinfeld et al. in press) and foresters, landscapers and arborists are always interested in cultural practices at the nursery which may improve tree survival, nutrition and performance.

Mycorrhizal fungal hyphae associate with plant roots in a symbiotic non-parasitic relationship. Two categories of mycorrhizal fungi are vesicular-arbuscular (VAM) mycorrhiza where the hyphae enter the root and penetrate the root cells where they form branched arbuscles. VAM fungi are also referred to as arbuscular mycorrhizas, because not all form vesicles. A second category of mycorrhizal fungi are the ectomycorrhizal fungi. The ectomycorrhizal fungal hyphae associate with the surface of roots of the tree and grow in spaces between the root cells thereby forming a Hartig net around the cells, but do not penetrate the root cells as in the case of the vesicular-arbuscular mycorrhizal fungi. Many tree species will form only one type of mycorrhizal relationship. Yews form VAM relationships, while trees such as firs, pines, spruce, oak, birch, and beech form ectomycorrhizal relationships.

Conifer tree establishment depends on rapid root development and ectomycorrhizal colonization (Amaranthus and Perry 1989). Out-planting performance of inoculated seedlings has been improved in numerous studies by inoculation with ectomycorrhizae (Theodorou and Bowen 1970; Theodorou 1971; Momoh 1976; Ekwebelam and Odeyinde 1985, Amaranthus and Perry 1989). The importance of *Rhizopogon* sp. *ectomycorrhizae* in conifer establishment is shown by Castellano (1996) in his review of inoculation success with numerous ectomycorrhizal fungi used in forestry. Nutrient acquisition is considered a major factor in improving seedling performance. Significant increases in phosphorus uptake have been reported for mycorrhiza-inoculated conifer seedlings (Theodorou and Bowen 1970; Lamb and Richards 1971, 1974; Skinner and Bowen 1974a, 1974b; Chu-Chou and Grace 1985). Potassium (Theodorou and Bowen 1970; Lamb Richards 1971), sodium (Melin et al 1958), total nitrogen (Chu-Chou and Grace 1985), and ammonia forms of nitrogen (Finlay et al. 1988) are all increased by mycorrhizal inoculation. Ectomycorrhizae also enhance water uptake by their hosts (Trappe and Fogel 1977; Reid 1979; Parke et al. 1983) although tolerance to low water potentials vary widely among mycorrhizal species (Mahal and Reid 1973; Theodorou 1978; Parke et al. 1983).

The requirements for mycorrhizal sporulation, growth, and formation are still poorly understood despite the importance of the plant and mycorrhizal relationship. Mycorrhizal spores require germination, hyphal growth and root penetration to successfully form mycorrhizae and numerous physical, genetic and chemical factors may be involved. Numerous authors have reported that the presence of living roots are critical for spore germination and hyphal elongation (Siqueira et al. 1985; Bonfante-fasolo 1988; Becard and Piche, 1989). Plant signal molecules produced by roots may be essential for the symbiotic relationship to develop (Siqueira et al. 1991; Nair et al. 1991; Elias and Safir 1987; Graham 1982). The isoflavonoid formononetin (7-hydroxy, 4'-methoxy isoflavone) has been identified as an arbuscular mycorrhizal stimulating factor, promoting hyphal growth and root colonization (Nair et al. 1991, Gianinazzi-Pearson et al. 1989). No information is currently available on the effects of these isoflavonoids on ectomycorrhizal growth and mycorrhizal formation.

U.S. Pat. No. 4,550,527 to Hall et al. describes a carrier material having an adherent layer comprising an inoculum of a mycorrhizal fungus. Hall et al. does not describe using formononetin or alkali metal formononetinate compounds to stimulate the ectomycorrhizal colonization of the roots.

U.S. Pat. Nos. 5,002,603, 5,085,682 and 5,125,955 to Safir et al. describe the use of isoflavones as stimulants for the growth of vesicular-arbuscular mycorrhizal fungi. While Safir et al. describe the use of isoflavones as stimulants for the growth of VAM fungi, there is no disclosure regarding using formononetin and alkali metal formononetinate compounds to stimulate ectomycorrhizal colonization of roots in trees such as firs, pines, spruce, oak, birch, beech and others which harbor ectomycorrhizal fungal species.

U.S. Pat. No. 5,178,642 to Janerette describes ectomycorrhizal fungal inoculants for either woody or herbaceous plants. Janerette does not describe using formononetin or alkali metal formononetinate compounds to stimulate the ectomycorrhizal colonization of the roots.

U.S. Pat. No. 5,691,275 to Nair et al. describes formononetin and alkali metal formononetinate compounds for stimulating, the growth of vesicular-arbuscular mycorrhizal fungi which colonize plants such as corn, soybean, sorghum, asparagus, leek, onion, *Taxus* sp. and other woody species, coffee, clover, citrus, sea oats, wheat, potatoes and other crop plants. While Nair et al. describes VAM fungi stimulation in certain woody species such as *Taxus* sp. (Yew) which harbor VAM fungi, there is no disclosure regarding using formononetin and alkali metal formononetinate compounds to stimulate ectomycorrhizal colonization of roots in trees such as firs, pines, spruce, oak, birch, beech and others which harbor ectomycorrhizal fungal species.

While the related art teach compounds for stimulating the growth of vesicular-arbuscular mycorrhizal fungi, there still exists a need for improving ectomycorrhizal colonization of tree roots which harbor these fungal species.

OBJECTS

Therefore, it is an object of the present invention to provide a method for increasing ectomycorrhizal fungus colonization of the roots of a tree.

It is further an object of the present invention to provide a composition for inoculating tree roots comprising isoflavones and *Rhizopogon* sp ectomycorrhizal fungus spores.

These and other objects will become increasingly apparent by reference to the following description.

SUMMARY OF THE INVENTION

The present invention relates to a method for increasing ectomycorrhizal fungus colonization of roots of a tree which comprises inoculating the roots with an isoflavone selected from the group consisting of formononetin, an alkali metal formononetinate and mixtures thereof and spores of the ectomycorrhizal fungus which is indigenous to the tree in water so as to increase the colonization of the roots. In further embodiments, the ectomycorrhizal fungus is *Rhizopogon* sp. In further embodiments, the tree is a conifer. In further embodiments, the composition contains between 1 and 1000 mg/L of the isoflavone. In further embodiments, the *Rhizopogon* sp spores are present in a number which provides $10^2$ to $10^6$ spores to the inoculated roots of the tree. In still further embodiments, the tree is a seedling. In still further embodiments, the composition contains 10 to 100 mg/L of the alkali metal formononetinate and provides $10^4$ to $10^6$ spores per tree. In still further embodiments, the composition is a mixture of the isoflavone and the *Rhizopogon* sp in water. In still further embodiments, the tree is a Ponderosa pine and the *Rhizopogon* sp is *R. rubescens*. In still further embodiments, the tree is a Douglas fir and the *Rhizopogon* sp is *R. parksii*. In still further embodiments, the alkali metal formononetinate is potassium formononetinate.

The present invention also relates to a composition for inoculating roots of a tree which comprises a mixture of an isoflavone selected from the group consisting of formononetin, an alkali metal formononetinate and mixtures thereof, *Rhizopogon* sp spores and water, wherein the composition contains 1 to 1000 mg/liter of the isoflavone and the *Rhizopogon* sp in a number which provides $10^2$ to $10^6$ spores to the roots of the tree. Further embodiments of the composition provide $10^4$ to $10^6$ spores to the roots of the tree. In further embodiments, the tree is a Ponderosa pine and the *Rhizopogon* sp is *R. rubescens*. In further still embodiments, the tree is a Douglas fir and the *Rhizopogon* sp is *R. parksii*. In further still embodiments, the alkali metal formononetinate is potassium formononetinate.

DETAILED DESCRIPTION OF THE INVENTION

Figure 1:
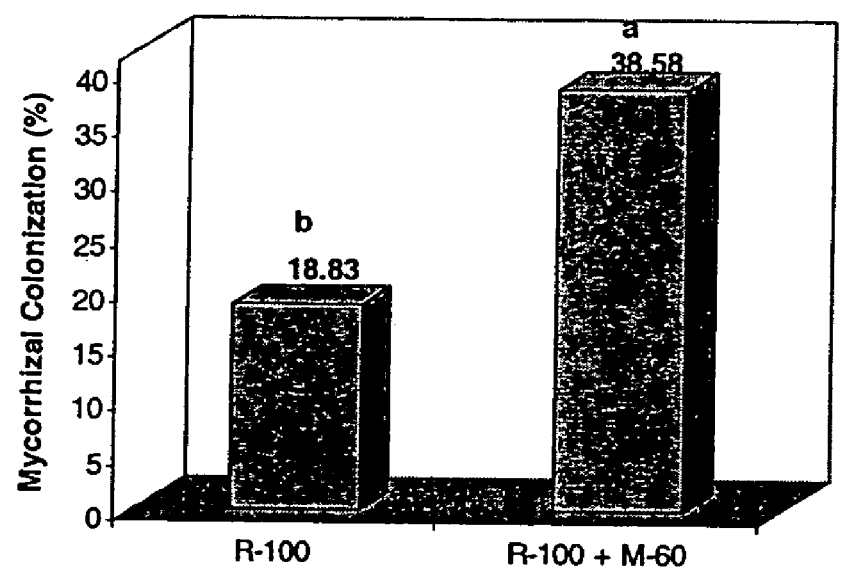
FIG. 1 illustrates mycorrhizal colonization (%) of Ponderosa pine seedlings with inoculation of *Rhizopogon rubescens* and application of potassium formononetinate. Columns not sharing the same letter are significantly different at $p<0.05$.

All patents, patent applications, government publications, government regulations, and literature references cited in this specification are hereby incorporated herein by reference in their entirety. In case of conflict, the present description, including definitions, will control.

As used herein the term "ectomycorrhizal" refer to the fungi belonging to the basidiomycetes or ascomycetes which include, but are not limited to *Amphinema byssoides, Cantharellus formosus, Cenococcum geophilum, Cortinarius violaceous, Craterellus tubaeformis, E. muricatus, Elaphomyces granulatus, Endogone* sp, *Hebeloma* sp, *L. deliciosus* var. *olivaceosordidus, Lactarius* sp., *Lactarius rubrilacteus, Lactarius scrobiculatus, Piloderma fallax, Rhizopogon vinicolor, Rhizopogon* sp., *Russula delica, Russula densifolia, Russula nigricans, Suillus caerulescens, Suillus lakei, Tomentella* sp., *Thelephora terrestris, Tricholoma magnivelare, Truncocolumella citrina,* and *Tuber* sp. The ectomycorrhizal fungal hyphae associate with the surface of roots of the tree and grow in spaces between the root cells thereby forming a Hartig net around the cells, but do not penetrate the root cells as in the case of the vesicular-arbuscular mycorrhizal fungi. *Rhizopogon, Endogone, Tuber* and *Hebeloma* are some genera that have been associated with Douglas fir.

As used herein the term "formononetin" refers to 7-hydroxy, 4'-methoxy isoflavone.

As used herein the term "alkali metal formononetinate" refers to any alkali metal salt of formononetin, preferably sodium and potassium salts.

As used herein the term "tree" refers to woody perennial plants including bushes, shrubs, and large trees which harbor ectomycorrhizal fungal species. The term encompasses both deciduous and coniferous trees.

Considerable effort and expense is directed toward site preparation in many suburban and urban planting areas. Mycorrhizal inoculum density and viability are often reduced as a result of site preparation activities (Amaranthus et al. 1994, 1996; Dumroese et al. 1998). Amaranthus et al. (1996) found significant reductions in mycorrhizal abundance and diversity, including *Rhizopogon* spp. with moderate to high levels of organic matter removal and compaction. *Rhizopogon* spp. do not produce airborne spores and this belowground fruiting truffle genera requires animals to spread spores via fecal pellets. Clearly, many disturbed urban and suburban sites have a low mycorrhizal forming potential and it is unlikely that *Rhizopogon* mycorrhizal fungi would be introduced from surrounding natural areas. Thus, nursery inoculation with *Rhizopogon* spore suspensions is necessary to assure colonization benefits in the out-planted environment.

Similarly, forest management practices such as clear-cutting frequently result in the reduction of mycorrhizae formation, which can be especially important in poor soils or marginal environments (Perry et al. 1987; Amaranthus and Trappe, 1992). The importance of mycorrhizal colonization in the establishment and the growth of forest trees has long been recognized. Globally, hundreds of millions of conifer seedlings are inoculated with mycorrhizal fungi annually.

The compound formononetin can be provided as formononetin (7-hydroxy, 4'-methoxy isoflavone) or as formononetinate (alkali metal salt of 7-hydroxy, 4'-methoxy isoflavone). These isoflavones have been shown to stimulate arbuscular mycorrhizal (AM) colonization on a variety of plants, and increased yields in a number of economically important plant species. Experiments were conducted to test the ability of formononetin in various concentrations to increase ectomycorrhizal colonization by *R. rubescens* and *R. parksii* and the impact on the growth to Ponderosa pine and Douglas-fir seedlings. The isoflavonoid formononetin (7-hydroxy, 4'-methoxy isoflavone), as formononetinate, has been previously shown to increase colonization by endo- but not ectomycorrhizae. The results of the following examples have been repeated in oak and other cultivated landscape trees. The trees grow faster and help trees which are growth impaired.

EXAMPLES

The ability of potassium formononetinate to increase colonization, nutrient uptake, and growth in Ponderosa pine and Douglas-fir seedlings inoculated with *Rhizopogon* ectomycorrhizae spores is described herein. Potassium formononetinate significantly increased root colonization by *Rhizopogon* in both tree species at 60 mg/L. In Douglas-fir seedlings, potassium content was significantly higher in seedlings treated with 60 mg/L of potassium formononetinate and *Rhizopogon parksii* than in either the untreated plants, or those treated with *R. parksii* alone. Treatment with *R. parksii* and potassium formononetinate significantly increased Douglas-fir phosphorus and nitrogen content over the untreated control, but not over the treatment with *R. parksii* alone. In Ponderosa pine seedlings, potassium formononetinate treatment at 60 mg/L significantly increased nitrogen, but not phosphorus or potassium content over seedlings treated with *R. rubescens* alone. Caliper diameter of Ponderosa pine was not significantly increased with the application of potassium formononetinate, while in Douglas-fir, both *R. parksii* and *R. parksii* plus potassium formononetinate treatments increased caliper size over the control.

Material and Methods

Ponderosa pine seeds were sown in a soilless mix (50:50 peat:vermiculite) in 2 $cm^3$ cells in STRYOBLOCK™ containers (Beaver Plastics, Corvallis, Oreg.) inside the greenhouse at the J. Herbert Stone Nursery in Central Point, Oreg. Eight weeks after germination, all emerging ponderosa pine seedlings were inoculated with 100,000 spores each of the ectomycorrhizal fungus *R. rubescens* using a liquid suspension applied via a traveling irrigation boom. Liquid spore suspension was prepared by maceration of *R. rubescens* sporocarps in distilled water for 10 min, followed by serial dilution with distilled water. Spore concentrations were determined using a hemacytometer. Soluble fertilizer (250 ppm N, 60 ppm P and 158 ppm K plus micronutrients) was applied with irrigation for optimum growth. Temperatures were held between 65° F. and 75° F. in the greenhouse. The seedlings were hardened off about six months after sowing by reducing the amount of irrigation water and fertilizer in it (to 50 ppm N, 31 ppm P and 150 ppm K plus micronutrients). No pesticides were used on the crop during this period. Ponderosa pine seedlings were then each inoculated again with 100,000 spores of *R. rubescens* using the same inoculation procedure.

Eight months after sowing, fourteen Ponderosa pine seedlings were randomly selected (2 or 3 each from 6 trays of seedlings) to determine mycorrhizal colonization by the mycorrhizal fungus *R. rubescens*. Mean colonization by *R. rubescens* on inoculated container seedlings was 11 percent before application of the treatments. A control group, composed of three trays (20 seedlings each), was treated again with spore suspensions of *R. rubescens* (at 100,000 spores per cavity) using a graduated pipette. The treatment group (three trays of 20 seedlings each) received *R. rubescens* (at 100,000 spores per cavity) plus potassium formononetinate suspensions mixed at a rate of 60 mg/L of soilless mix (0.33 g per 60 seedlings). Trays were organized in a randomized block design. Potassium formononetinate was provided by VAMTech L.L.C., Lansing, Mich.

Douglas-fir seeds were sown in 2 $cm^3$ in cells in Stryoblock™ containers filled with soilless mix (50:50 peat:vermiculite) in the greenhouse at the J. Herbert Stone Nursery in Central Point, Oreg. Soluble fertilizer applications, temperatures, and hardening off procedure were the same as those described for Ponderosa pine above. No pesticides were used on the crop during this period, and no mycorrhizal inoculum was applied prior to applications of treatments.

Eight months after sowing, fourteen Douglas-fir seedlings were randomly sampled (2 or 3 from 6 trays) to determine colonization by the mycorrhizal fungus *R. parksii*. No colonization by *R. parksii* was present at this time. The treatments applied to three trays of 20 seedlings each were a control with no potassium formononetinate or mycorrhizal inoculation (C), potassium formononetinate only at 20 mg/L of soilless mix (M-20), mycorrhizal inoculation only at 100,000 *R. parksii* spores/cavity applied with a graduated pipette (R-100), mycorrhizal inoculation with *R. parksii* at 100,000 spores per cavity plus potassium formononetinate at 20 mg/L of soilless mix (0.11 per 60 seedlings) (M-20+R-100), mycorrhizal inoculation with *R. parksii* at 100,000 spores per cavity plus potassium formononetinate at 60 mg/L of soilless mix (0.33 per 60 seedlings) (M-60+R-100), and mycorrhizal inoculation with *R. parksii* at 50,000 spores cavity plus potassium formononetinate at 20 mg/L of soilless mix (M-20+R-50). Potassium formononetinate was provided by VAMTech L.L.C., Lansing, Mich.

Thirteen months after sowing, twelve Douglas-fir and Ponderosa pine seedlings were chosen at random from each treatment and sampled for mycorrhizal colonization by *Rhizopogon*. Roots were gently washed free of soil and extraneous material and sub sampled in three cross sections (1.5 cm broad) of the entire root systems in upper, middle and lower positions, respectively. All active root tips were tallied as *Rhizopogon*, other mycorrhizal, or non-mycorrhizal from characteristics observed through a dissecting microscope at 2× by 5× magnification. *Rhizopogon* identification was verified using color, surface appearance, branching, morphology, degree of swelling, length and characteristics of rhizomorphs. *R. rubescens* mycorrhizae were creamy white and developed a gradient of yellow and reddish coloration with maturity and upon bruising. The *R. rubescens* mycorrhizal had a two-layered mantle and abundant rhizomorphs developing a compact coralloid morphology with maturity. *R. parksii* mycorrhizal formed pinnate clusters that developed patches of dark pigmented surface hyphae overlaying typically white or pale mantles. The density and coverage of the dark surface hyphae were most pronounced on older ectomycorrhizae forming a reddish-brown to grayish reddish brown fibrillose epicutus.

The diameter of all seedlings in all of the treatments was then measured with a caliper. Needle samples for Ponderosa pine and Douglas-fir were collected from 4 randomly selected seedlings in each treatment for foliar analysis. Samples were analyzed for total nitrogen and phosphorus (Kjeldahl digest with ammonia and orthophosphate read on an auto-analyzer), and extractable potassium (microwave digestion) with inductively couples argon plasma spectrometer (ICPMS).

Statistical Procedures

All trials were conducted in a randomized complete block design. Analyses of variance (ANOVA) were performed separately for seedling caliper, nutrient content, and mycorrhizal colonization (Steel and Torrie 1980). Means comparisons were calculated using Fisher's LSD (least significant difference). Residuals from the performed ANOVA's were examined using normal probability plots, tests that the residuals come from normal distributions and plots of residuals versus predicted values. Before analysis, mycorrhizal colonization data as logarithmically transformed to compensate for log-normally distributed values (Steel and Torrie 1980).

Results

Figure 2:
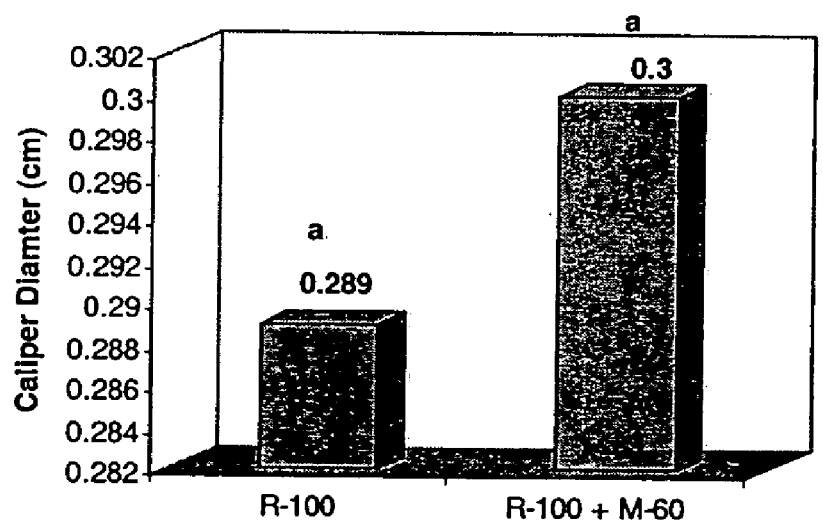
FIG. 2 illustrates the caliper diameter of Ponderosa pine seedlings inoculated with *Rhizopogon rubescens* and treated with potassium formononetinate. Columns not sharing the same letter are significantly different at $p<0.05$.

Mycorrhizal colonization: Mycorrhizal colonization of Ponderosa pine seedlings by *R. rubescens* was significantly increased from 18.8% colonization in the R-100 treatment to 38.6% colonization in the M-60+R-100 treatment as shown in FIG. 1. Mycorrhizal colonization of Douglas-fir roots by *R. parksii* was significantly greater in the M-60+R-100 treatment (61.5%) than in any other treatment. Mycorrhizal was also significantly greater in the R-100 (26%) and M-20+R-100 (10%) treatments than in either the C (0%) and M-20 (0%) treatments as shown in FIG. 2.

Figure 3:
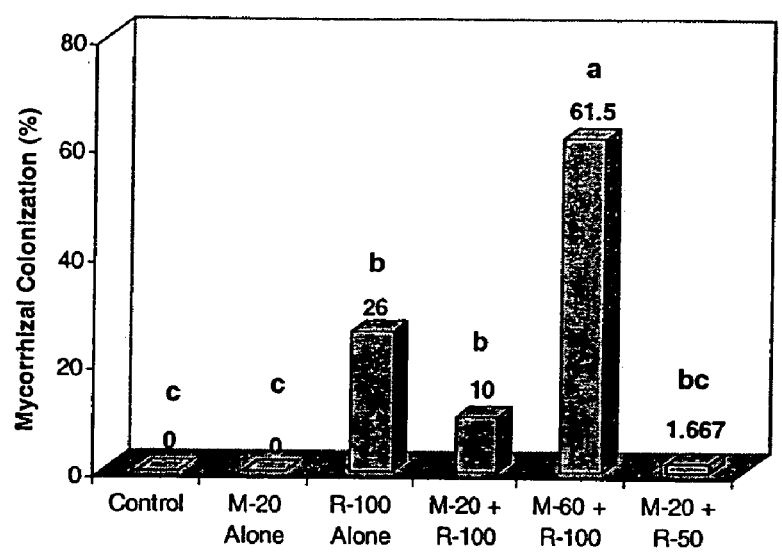
FIG. 3 illustrates mycorrhizal colonization (%) of Douglas-fir seedlings inoculated with *Rhizopogon rubescens* and treated with potassium formononetinate. Columns not sharing the same letter are significantly different at $p<0.05$.
Figure 4:
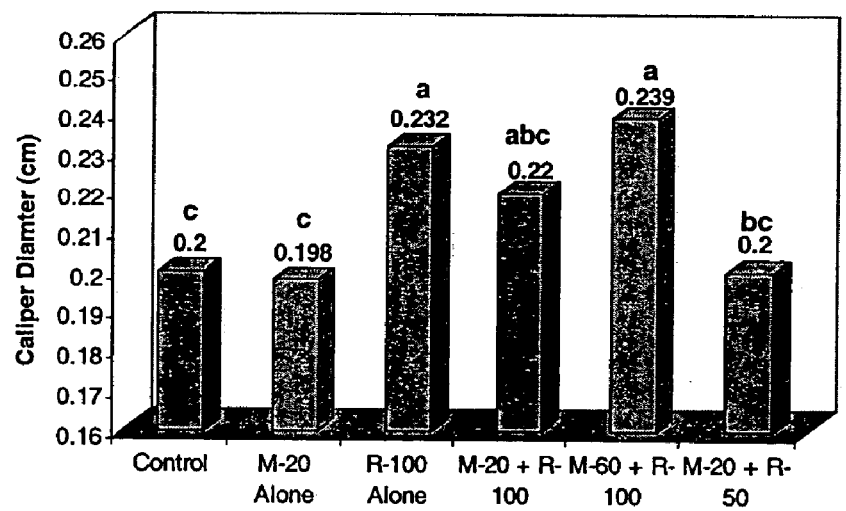
FIG. 4 illustrates the caliper diameter of Douglas-fir seedlings inoculated with *Rhizopogon rubescens* and treated with potassium formononetinate. Columns not sharing the same letter are significantly different at $p<0.05$.

Caliper: In Ponderosa pine seedlings, caliper diameter was not significantly affected by the addition of potassium formononetinate as shown in FIG. 3. With Douglas-fir, R-100 (0.23 cm) and M-60+R-100 treatments had significantly greater caliper diameter (0.24 cm) than the C (0.2 cm), M-20 (0.2 cm) or M-20+R-50 (0.2 cm) treatments as shown in FIG. 4.

Figure 5:
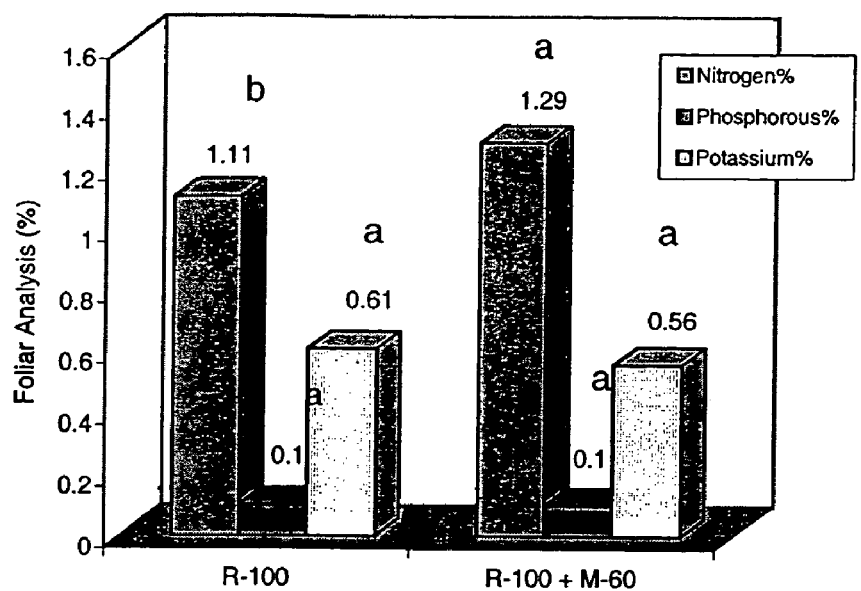
FIG. 5 illustrates the foliar nitrogen, phosphorous and potassium content of Ponderosa pine seedlings with inoculation of *Rhizopogon parksii* and application of potassium formononetinate. Columns not sharing the same letter are significantly different at $p<0.05$.

Nutrient analysis: Foliar analysis of the needles of Ponderosa pine revealed significantly greater nitrogen content (1.29%) in the M-60+R-100 treated seedlings than in the M-100 treatment (1.11%). There were no significantly differences in foliar phosphorous or potassium levels in Ponderosa pine as shown in FIG. 5.

Figure 6:
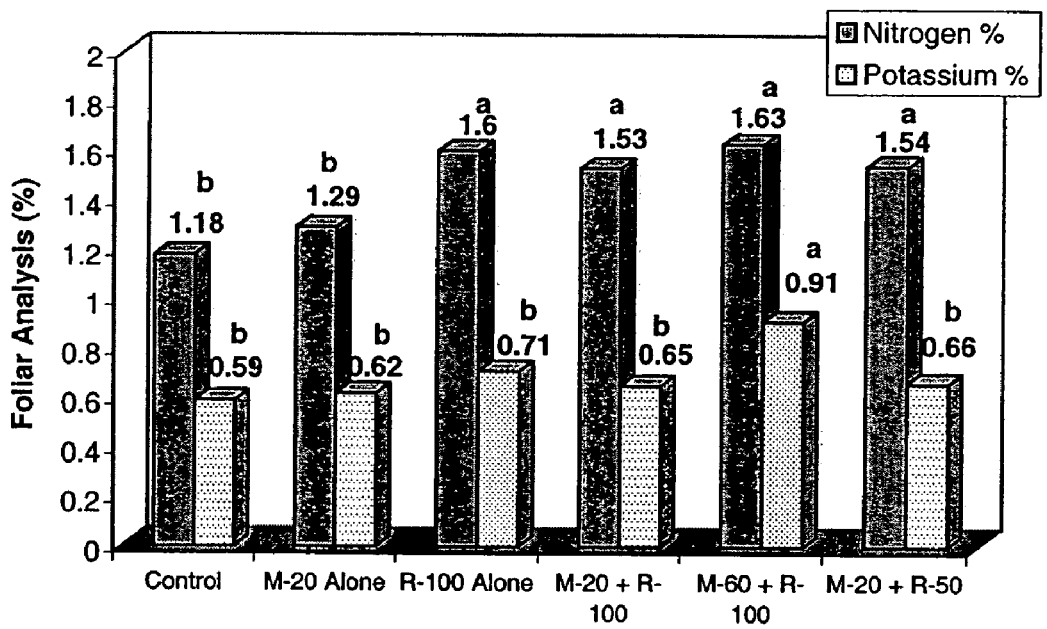
FIG. 6 illustrates the foliar nitrogen and potassium content of Douglas-fir seedlings with inoculation of *Rhizopogon parksii* and application of potassium formononetinate. Columns not sharing the same letter are significantly different at $p<0.05$.
Figure 7:
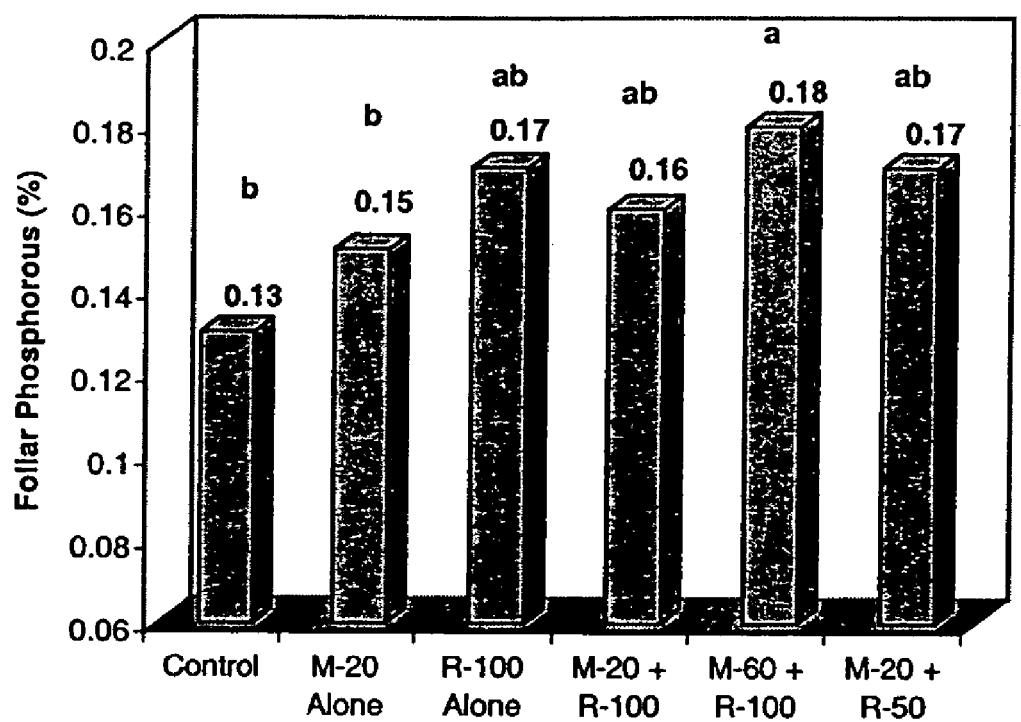
FIG. 7 illustrates the foliar phosphorous content of Douglas-fir seedlings with inoculation of *Rhizopogon parksii* and application potassium formononetinate. Columns not sharing the same letter are significantly different at $p<0.05$.

Foliar analysis of Douglas-fir needles indicated higher nitrogen content in the M-60+R-100 (1.63%), R-100 (1.6%), M-20+R-100 (1.53%), and M-20+R-50 (1.54%) treatments than in the C (1.18%) or M-20 (1.29%) treatments as shown in FIG. 6. Potassium content was significantly higher in the M-60+R-100 treated seedlings than in any other treatment. Phosphorous content was significantly greater with the M-60+R-100 (0.2%) treatment than with C (0.13%) and M-20 (0.15%) treatments as shown in FIG. 7.

Figure 8:
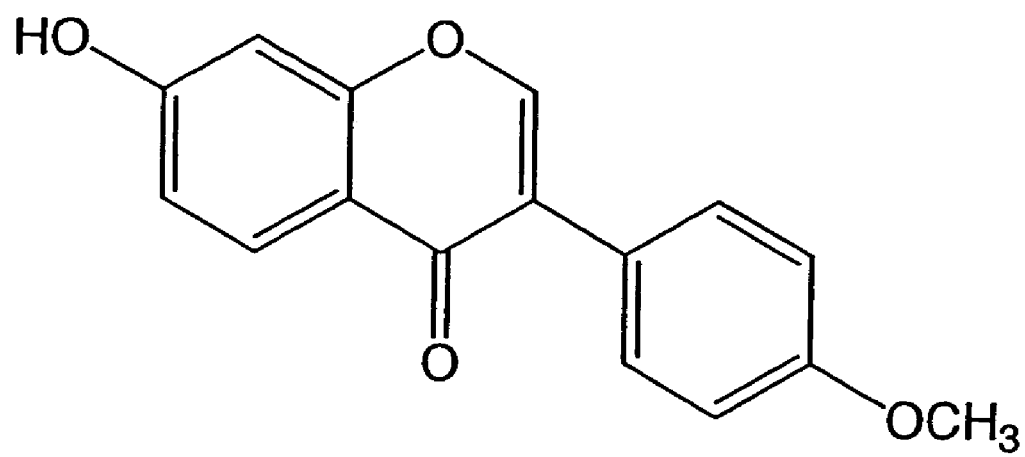
FIG. 8 illustrates the chemical structures of formononetin (7-hydroxy, 4'-methoxy isoflavone) and potassium formononetinate (potassium salt of 7-hydroxy, 4'-methoxy isoflavone).
Figure 8:
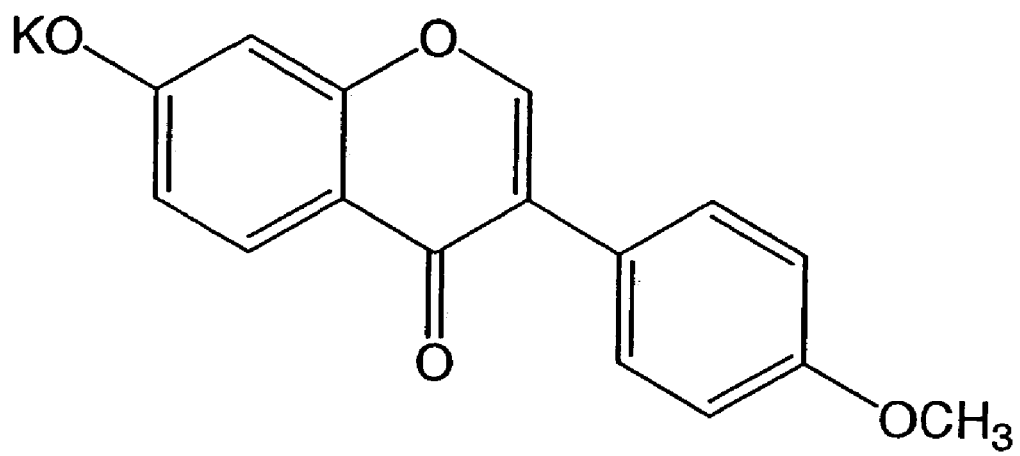

Although the compound formononetin (FIG. 8) and its soluble form potassium formononetinate (FIG. 8) have been previously shown to increase the root colonization (Nair et al. 1991) and crop yield in field soils of endomycorrhizal plants, their effect on ectomycorrhizal plants has never been established. The results demonstrate the benefits of potassium formononetinate with ectomycorrhizal inoculation. Potassium formononetinate showed an increase in the ectomycorrhizal colonization and nutrient uptake. Potassium formononetinate was shown to enhance colonization by *Rhizopogon* inoculum in both Douglas-fir and Ponderosa pine seedlings. Overall, the rate of potassium formononetinate at 60 mg/L appeared to be more effective than the lower rate at 20 mg/L.

Since ectomycorrhizal fungi are the predominant mycobionts of commercially important forest tree species (Grove and Malajczuk, 1994) the results show the usefulness of potassium formononetinate in commercial forestry and silviculture. In addition to increasing the effectiveness of mycorrhizal inoculum, it is possible for potassium formononetinate to increase the colonization of naturally occurring ectomycorrhizae similar to the benefits observed in studies with endomycorrhizae.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the Claims attached herein.

We claim:

1. A method for increasing ectomycorrhizal fungus colonization of roots of a tree which comprises:
   inoculating the roots with an isoflavone selected from the group consisting of formononetin, an alkali metal formononetinate and mixtures thereof and spores of the ectomycorrhizal fungus which is indigenous to the tree in water so as to increase the colonization of the roots.

2. The method of claim 1 wherein the ectomycorrhizal fungus is *Rhizopogon* sp.

3. The method of claim 2 wherein the tree is a conifer.

4. The method of claim 2 wherein the composition contains between 1 and 1000 mg/L of the isoflavone.

5. The method of claim 2 wherein the *Rhizopogon* sp spores are present in a number which provides $10^2$ to $10^6$ spores to the inoculated roots of the tree.

6. The method of claim 2 wherein the tree is a seedling.

7. The method of claim 2 wherein the composition contains 10 to 100 mg/L of the alkali metal formononetinate and provides $10^4$ to $10^6$ spores per tree.

8. The method of claim 2 wherein the composition is a mixture of the isoflavone and the *Rhizopogon* sp in water.

9. The method of any one of claims 2, 3, 4, 5, 6 or 7 wherein the tree is a Ponderosa pine and the *Rhizopogon* sp is *R. Rubescens*.

10. The method of any one of claims 2, 3, 4, 5, 6 or 7 wherein the conifer is a Douglas fir and the *Rhizopogon* sp is *R. parksii*.

11. The method of any one of claims 2, 3, 4, 5, 6 or 7 wherein the alkali metal formononetinate is potassium formononetinate.

* * * * *